June 6, 1967 P. F. KELLAM ETAL 3,323,469
TROLLEY HOLDER
Filed Feb. 3, 1965

PAUL F. KELLAM
JESUS T. FLORES
INVENTORS

BY Buehler & Arant
ATTORNEYS

United States Patent Office 3,323,469
Patented June 6, 1967

3,323,469
TROLLEY HOLDER
Paul F. Kellam, 2341 Wilshire Ave., La Habra, Calif. 90631, and Jesus T. Flores, 9302 Jan Court, Pico-Rivera, Calif. 90660
Filed Feb. 3, 1965, Ser. No. 430,025
5 Claims. (Cl. 104—89)

ABSTRACT OF THE DISCLOSURE

An overhead monorail trolley conveyor system which includes a grooved wheel traveling on the monorail, a hanger extending vertically downward from the wheel, and load engaging means on the lower end of the hanger, in which a trolley holding station is provided for stopping the trolley wheel at a selected position on the monorail and thereafter securing the trolley wheel in that stopped position, the trolley holding station including a supporting frame and a finger attached to the supporting frame above the monorail and in substantially parallel relationship to the monorail, the protruding end of the finger being tapered so that as the trolley wheel approaches the station it is progressively squeezed between the finger and the rail.

This invention relates to trolley holding means and more particularly to such means adapted for the purpose of anchoring meat carrying trolleys against rolling, twisting or rocking movements during loading or unloading operations.

Meat packers and others engaged in the handling of large animal carcasses, or parts thereof, typically move their heavy loads (which can weigh anywhere from two or three hundred pounds up to the dressed weight of a whole steer or other large meat animal) from place to place in slaughter houses, refrigerated storage rooms, cold storage meat lockers, etc., by means of trolleys running on overhead monorails, with depending hooks on which the meat is hung. Trolleys in present day use for this purpose are rather precariously perched on their monorail tracks, being held in place by gravity balance and the use of peripheral roller flanges. This results in potential danger to those who must work with and around such trolleys, particularly during periods of loading and unloading when the possibility of derailment is particularly acute. In addition to the danger of possible human injury from a falling trolley (a trolley typically weighs several pounds and could obviously cause severe physical injury if it struck someone in falling), its contact with meat could conceivably result in contamination, and subsequent spoilage, of the meat.

In view of the instability of meat carrying trolleys, especially during their loading or unloading periods, it is difficult and dangerous for one to attempt loading or unloading thereof by himself. It is quicker and safer for two men to load and unload the meat, one holding, or helping to hold, the trolley in place while the other does all or most of the muscle work. There are several ways in which a meat trolley can be derailed, especially during loading or unloading operations. For one thing, the heavy load can unseat the trolley from the rail by its sidewise swaying, as a result of handling, or other, difficulties. For another, the meat can be induced to twist about its point of support to the extent of popping the trolley roller off of its track in extreme cases. Additionally, the meat can sway back and forth in an arc planarly consistent with the run of the monorail to a dangerous extent. Combinations of these various movements are common in trolley-suspended meat loads.

We have, by this invention, provided a device, of sufficiently light weight for easy handling by all, which is readily moveable and can be placed where needed on an overhead trolley monorail to anchor a meat, or equivalent, trolley against derailing movement, particularly during loading or unloading of the trolley. The device is adaptable, as will be seen, to chock a trolley roller against rolling or axial rocking movement, while, at the same time, substantially minimizing the possibility of roller derailment from twisting motion in the meat load while suspended on the trolley. It will thus be apparent that by means of our trolley holding or anchoring device it is possible to so stabilize a meat, or similar, trolley as to make it easily feasible for one man to load or unload the trolley with substantially no danger of derailing, or unseating, it.

It is thus a principal object of our invention to provide relatively lightweight and portable holding means for easy installation adjacent a meat trolley to prevent its movement during loading and unloading operations.

It is another object of the invention to provide such means adaptable for preventing roller derailment of the trolley during loading and unloading thereof.

It is still another object of the invention to provide such means adaptable for the substantial prevention of twisting or rocking of the meat load while it is suspended, or partly so, on the trolley.

Other objects, advantages, and features of the invention will be apparent from the appended drawings, of which:

Figure 1:
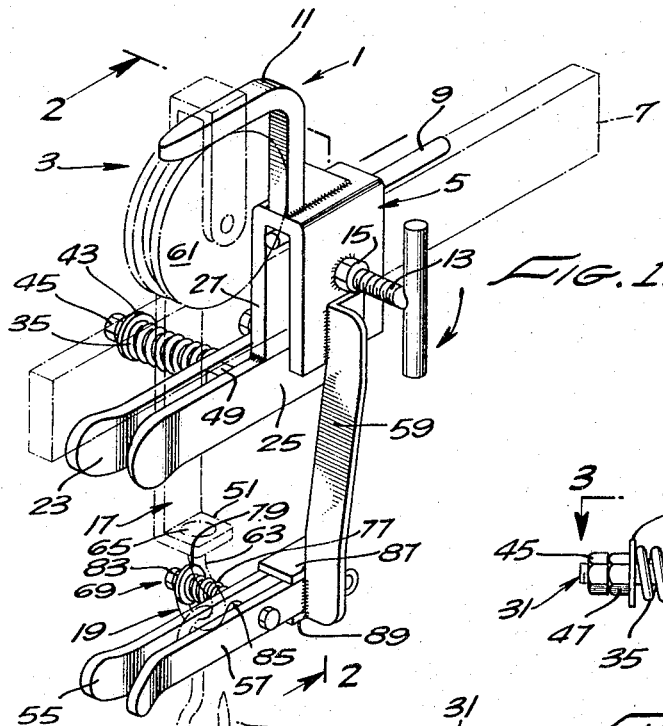
FIGURE 1 is a perspective of a preferred embodiment of our trolley holding device operatively emplaced on a meat trolley monorail, they monorail, a meat trolley anchored thereby, and the upper part of a load hung on the trolley being depicted in phantom outline.

Considering now the drawing in greater detail, there is shown a preferred form of a trolley holder 1 in accordance with this invention, interengaged with a meat trolley 3 in holding relationship, the meat trolley being depicted in phantom outline in FIGURE 1 to better reveal the manner in which the parts of the trolley holder perform their various functions. Trolley holder 1 has a metal slider 5, of U-shaped or channel-like cross section, which fits snugly but loosely over a trolley monorail, such as shown at 7 variously in the drawing, and permits easy placement of the holder at any desired point on the rail, as well as easy removal of the holder from its rail position after it has served its temporary purpose. As the drawing shows, slider 5 fits down over the top of the monorail with the enclosed end of its U-shaped channel up. Fixedly welded within the channel of slider 5, in alignment with and centrally disposed in said channel, is a section of hard metal rod 9, of circular cross-section. Rod section 9 serves as a sliding element for slider 5, its small area of contact with monorail 7, due to its circular cross-section, minimizing the frictional resistance to movement of the slider along the monorail (or rail as it is sometimes hereinafter referred to). By virtue of this feature, the trolley holder can readily be slid along, rather than lifted on and off of, a trolley rail to move it to desired locations thereon. In addition to its above-mentioned advantages, metal rod 9, by virtue of its relatively hard nature, provides a minimal-wear sliding surface of contact with the trolley rail.

Integrally affixed to the top of slider 5 by welding means, and braced in position by a buttressing metal web 11, welded in place as shown, is a bent metal finger 11. Finger 11 is bent to an L shape and disposed with one leg of the L rising upwardly from the forward edge of the slider and the other leg extending forwardly from the bend over the monorail. The forwardly extending leg of finger 11 is tapered to a blunt point, as FIGURE 1 shows particularly well, and the level of elevation of that leg is such as to permit its insertion in the upper groove of the trolley roller when the troller is rolled to anchoring interengagement with the holder. Finger 11 is of generally square cross section and the taper angles and dimensions of its forward end, as well as all other dimensions of the involved parts, are such as to effect gradually tightening friction contact between the finger and the bottom and side walls of the roller groove when it is pressed further into the groove as a result of trolley movement into closer interengagement with the trolley holder. The tight friction fit resulting from this forced mating of the trolley roller groove and finger 11 serves to firmly anchor the trolley against rolling movement along its monorail track and, at the same time, provides a certain amount of stability against sidewise tilting of the trolley roller from its upright position on, or twisting of the roller from, the monorail.

It is, of course, necessary to somehow lock slider 5 in place on rail 7 before wedging the trolley against the trolley holder to lock it in place. This is accomplished by tightening a clamp screw 13, passing entirely through a hole in the wall of slider 5, to end locking contact with rail 7. Clamp screw 13 turns in mating engagement with a nut 15 welded to the outer wall of slider 5 over a nonthreaded hole therethrough which is an alignment with the nut opening and of large enough cross-section to freely admit the screw. A threaded hole could be substituted for the nonthreaded one in the slider wall, if desired, with or without a cooperating nut equivalent to nut 15.

Trolley 3 is of a conventional and well known type and need not be described in detail here, except as necessary to explain the functioning of our trolley holder. Consistent with this, and as the drawing shows, trolley 3 has a downwardly depending load bearing strap 17, offset to one side of the trolley roller in the manner illustrated, with an inturned bottom end, or ledge, 51 from which a ring 19 supporting a meat hook 21 is suspended. The meat load is hung on meat hook 21 and moved about by the trolley in this suspended fashion.

As those skilled in the art are aware, and others will realize from an understanding of the manner of functioning of trolley 3, the loading of heavy animal carcasses or sections (quarters, halves, etc.) thereof on trolleys, as well as the unloading of meat therefrom, is conducive to the propagation of twist, pitch and yaw inducing forces, or combinations thereof, directed against the trolley roller. These forces act on the roller through strap 17 and one feature of the pictured embodiment of our trolley holder comprises means of damping them in strap 17 thus preventing their transmission to the roller with attendant danger of its derailment or other adverse effect.

Figure 2:
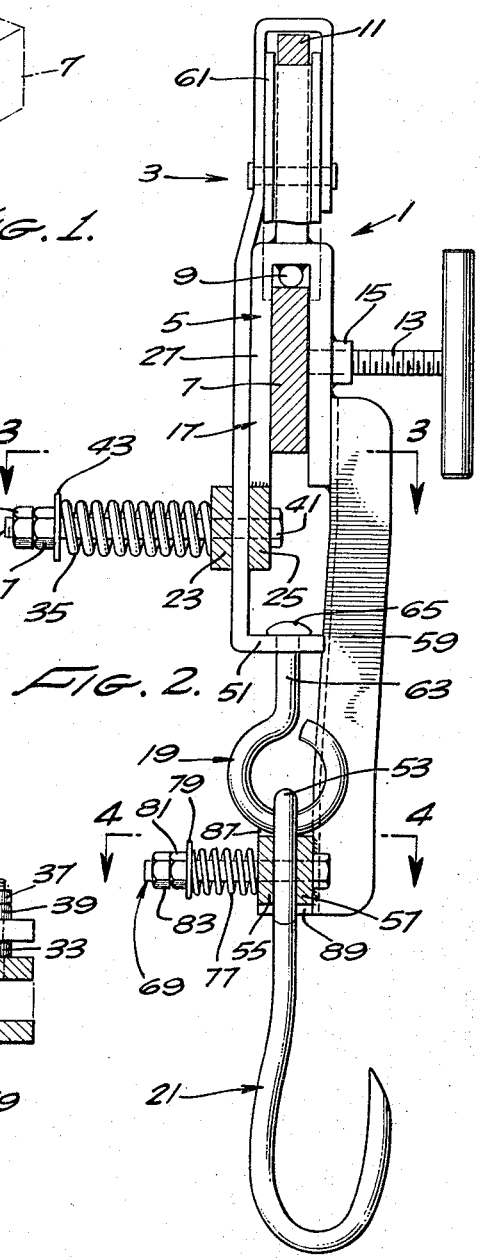
FIGURE 2 is an enlarged cross section of the trolley holding device taken along section plane 2—2 of FIGURE 1, showing, in addition, a monorail in section and a trolley, partially broken away, locked in position thereby.

The above-indicated damping means comprises two forwardly extending arms 23 and 25, disposed horizontally and substantially parallel to, underneath, and transversely offset with respect to monorail 7. The offset distance of arms 23 and 25 from the monorail is that amount to permit their embrace of strap 17, and their spacing with respect to each other is such as is necessary to freely admit strap 17 therebetween, in close but nonbinding fit, when trolley 3 is in anchored interengagement with trolley holder 1. Consistent with these objects, as FIGURE 2 shows particularly well, the wall of U-shaped slider 5 adjacent downwardly depending trolley stray 17, hereinafter referred to as slider side wall, or side wall, 27, is just thick enough to fill the space between said strap 17 and monorail 7, and forwardly extending arm 25 is affixed to the bottom of side wall 27 in such orientation as to, in effect, extend that member in the downward direction. As thus affixed to slider side wall 27, arm 25 projects forwardly beyond the front end of slider 5 a sufficient distance to pass down hanging strap 17 of the trolley when the latter is embraced by trolley holder 1 in its holding capacity. As the obvious result of the sizing the positioning of arm 25, it flanks strap 17 in close, but not binding, proximity.

Figure 3:
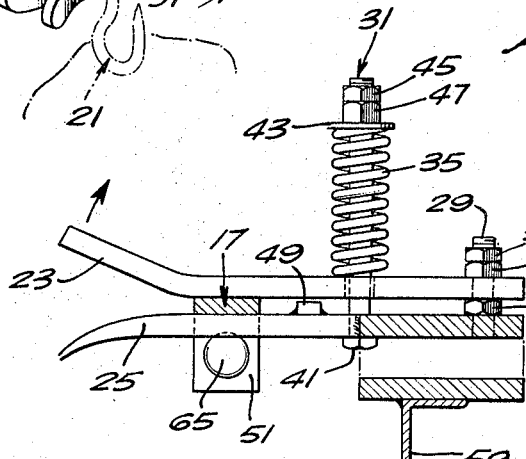
FIGURE 3 is a sectional view of the device embracing a load supporting member of the trolley, viewed from above along line 3—3 of, and in a position of clockwise displacement of 90 degrees from its orientation in, FIGURE 2.

Arm 23, as the drawing shows, is disposed transversely outwardly from arm 25, with respect to rail 7, and, as previously indicated, in substantially parallel relationship to arm 25. The parallel relationship of arms 23 and 25, when in functional disposition, is maintained by means of two bolts, 29 and 31, a nut 33, a helical spring 35, and trolley straps 17. Bolt 29 is a relatively short threaded member connecting arms 23 and 25 near their rear ends, as shown in FIGURE 3, securely rooted at one end in a receptive hollow in arm 25, said hollow being disposed about mid-way of the width of that arm. This is accomplished by welding, or equivalent, means whereby the bolt is fixedly secured to arm 25. The invention, however, is not limited to this means of affixation and bolt 29 can be either force-fitted into an appropriately located opening in arm 25 or threaded into a mating internal screw therein if desired. Bolt 29 can, of course, have a head on one end, similar to that on bolt 31, discussed below, within the scope of our invention. In any event, bolt 29 passes from its anchored root in arm 25 through an opening in arm 23, so sized and positioned in that arm as to maintain the arm in its properly parallel relationship with respect to arm 25 in the assembled trolley holder.

Acting as a spacer for arms 23 and 25, to keep them the proper distance apart to admit strap 17, is a nut 33 encircling bolt 29 in the position shown on FIGURE 3. Nut 33 can be so sized as to be threadable on bolt 29 to the position shown or it can be large enough to slide along the bolt in nonthreading engagement therewith. In either case the nut serves its purpose as a spacer between arms 23 and 25. By the same token, bolt 29 can be threaded along its shank to a sufficient distance to receive nut 33 in threadable relationship or not threaded along that portion of its shank disposed between arms 23 and 25. The same holds true for the relationship of bolt 29 to the opening in arm 23 through which it passes. All that is necessary here is that the opening be so sized and positioned as to permit the passage of bolt 29 through it, with or without mating thread engagement, and to assure the desired rear end spacing of arms 23 and 25, a preferred spacing being the rear end alignment shown in the drawing. Screwed onto the outer end of bolt 29 are two nuts 37 and 39, the outer one 37 serving as a lock nut for the inner one. Full threadable engagement of nuts 37 and 39 with bolt 29 is not necessary and any engagement which will assure substantially dependable fastening of arms 23 and 25 in their properly positioned relationships with respect to each other will suffice for purposes of this invention.

Bolt 31 is substantially longer than bolt 29, primarily to permit its passage through the hollow center of helical spring 35 in the manner shown in the drawing. As FIGURE 3 shows particularly well, bolt 31 has a hexagonal head 41 and it passes through cooperating openings in arms 23 and 25, from whence it passes through helical spring 35 and a washer 43. Positioned outwardly from washer 43 on bolt 31 are two nuts 45 and 47 which tighten in place to lock the involved parts together in the manner clearly indicated by the drawing. The washer is, of course, of adequate diameter to fit flush against the end of helical spring 35 and permit nuts 45 and 47 to be drawn tightly against its outer surface to accomplish their locking function. Any combination of parts, or configurational variations of same, which cooperate to yield the same working result as the illustrated spring-bolt-nut combination can, of course, be substituted therefor within the scope of this invention.

Weldably affixed to the side of arm 25 facing arm 23 is a raised stop 49 protruding from the arm surface slightly less than the thickness of strap 17 or nut 33, the latter being of substantially the same thickness as strap 17. The purpose of raised stop 49 is to prevent closure of arms 23 and 25, under the pressure of helical spring 35, when the trolley holder is not in use. There would probably not be complete closure of the arms in the absence of raised stop 49, since bolt 29 and its cooperating nuts would tend to prevent this. However, arm 23 would still be strongly urged in the direction of arm 25 and this would be undesirable since, as will be better understood from the complete description, hereinafter set forth, of the manner in which our trolley holder functions, its effect would be to restrict the space between the two arms and thus make the entry of strap 17 into that space more difficult.

As will now be fairly apparent, raised stop 49 in preventing arms 23 and 25 from closing together, or having a tendency to do this under the urging of helical spring 35, maintains arms 23 and 25 in greater receptive readiness for the insertion of strap 17 therebetween. To aid in the insertion of strap 17, the forward ends of arms 23 and 25 are bent outwardly away from each other, as shown in FIGURES 1 and 3. The forward ends of the arms, thus bent, serve to channel or guide strap 17 into its proper place in their embrace.

As previously indicated the lower end of strap 17 is bent sharply inwardly under rail 7 to form a platform-like edge, previously referred to as ledge 51. Protruding through a hole directly under monorail 7 in ledge 51 is the shank portion 63 of support ring 19, which supports meat hook 21. The shank of support ring 19 has a rivet head 65 on its end of sufficient diameter to support it through the hole in ledge 51 in the manner illustrated by the drawing. Meat hook 21 has a ring 53 integral with the upper end of its shank which interlinks with support ring 19 as shown.

An additional structural feature of the pictured embodiment of our invention consists of a pair of stabilizing arms 55 and 57, somewhat similar to arms 23 and 25, so positioned as to maintain ring 53 of meat hook 21 in a substantially fixed position and thereby prevent the occurrence of twisting movements in its meat load. Such twisting movements are, as previously indicated, dangerous in that they tend to pop the trolley roller off its monorail track. Stabilizing arms 55 and 57 are, similarly to arms 23 and 25, maintained in substantially parallel position. They are also maintained a proper distance apart to admit ring 53 of meat hook 21 therebetween in its flat dimension. As FIGURE 2 shows particularly well, stabilizing arms 55 and 57 are suspended immediately below, and substantially parallel to, monorail 7 by attachment to a slightly bent section of angle iron 59, the resulting bend therein being such as to assure the proper embracive orientation of the arms relative to meathook ring 53. The necessity of positioning the stablilizing arms so that they embrace meathook ring 53 when in service accounts for their suspension immediately below monorail 7. This is true because trolley 3 is so designed and constructed as to place the point of support of meathook ring 53 on ring 19 directly below trolley roller 61, and hence directly below the monorail. The reasons for this need not be discussed since they are known to those skilled in the art and also since trolley 3 is a standard item and not a part of my trolley holder.

Angle iron section 59 is firmly welded at its upper end to the clamp side of slider 5 as shown. As previously indicated, stabilizing arms 55 and 57 are supported in position by attachment to angle iron section 59, the support being accomplished with the aid of co-operating hardware somewhat similar to that aiding the support of arms 23 and 25. Stabilizing arm 57 is welded to the inturned side of the bottom end of angle iron section 59, the weld connection occurring at the rear end of the arm so that the latter projects forwardly therefrom in the meathook ring flanking, monorail-parallel position shown on the drawing and discussed above. Since the drawing clearly depicts the geometrical relationships among the various parts here involved (slider 5, angle iron section 59 and stabilizing arm 57) no further discussion thereof is here deemed necessary.

Stabilizing arms 55 and 57 are held in their properly spaced apart relationship by means of two bolts, 67 and 69, which serve roughly the same functions as bolts 29 and 31 serve with respect to arms 23 and 25. Thus, bolt 67 passes through aligned openings in the rear of stabilizing arms 55 and 57, is fastened at one end with two nuts 71 and 73, respectively, and has an intermediate spacer nut 75 serving to properly space the arms, all similarly to the manner in which bolt 29 passes through, is locked on and spaces arms 23 and 25, respectively. Likewise, bolt 69 passes through aligned openings, spaced forwardly of the bolt 67 openings, in arms 55 and 57 and it has, as cooperating hardware, a helical spring 77, a washer 79 and lock nuts 81 and 83, all for the same purpose, relative to stabilizing arms 55 and 57, of maintaining the stabilizing arms in proper space orientation with respect to each other and under adequate "squeezing" pressure to properly grip meathook ring 53 when embracing it, as that of their counterpart spring, washer and lock nut elements cooperative with bolt 31, relative to arms 23 and 25 and their embrace of depending trolley strap 17.

In comparing the cooperating hardware of arms 23 and 25 with that of arms 55 and 57, one major difference will be noted. Thus the latter set of hardware includes a spacer nut 85, encircling bolt 69 and positioned between stabilizing arms 55 and 57, serving the purpose of helping to prevent closure of arms 55 and 57 prior to insertion of meat hook ring 53 therebetween, whereas the former set (of hardware) has raised stop 49 on arm 25 to serve an equivalent purpose relative to keeping arms 23 and 25 separated for easier insertion of trolley strap 17 therebetween. In this connection, it will be observed that spacer nut 85, as was true of stop 49, does not preserve the full spacing required for the embracing function performed by its associated pair of arms. The reasons for this are the same as in the case of the analogous stop 49 situation and have already been discussed in connection therewith. One additional point, applicable to both spacing situations, might be made here, however. Thus, full spacing between either set of trolley embracing arms during nonuse of the trolley holder would be undesirable since snug gripping of the embraced parts of the trolley during mating engagement between it and the trolley holder would thereby be prevented. It will, of course, be obvious that a loose, sloppy embrace of trolley strap 17, meat hook ring 53, or both, by the trolley holder arms would provide less insurance against trolley migration from its anchored spot than would a tight embrace of either or both of those members. However, even loose embrace of one or both of the members serves to sharply curtail the transmission of incipient twisting or rocking forces in the meat load to the trolley roller and hence falls within the operational scope of our invention.

Turning again to the drawing, it will be observed that helical spring 35 is substantially longer than spring 77. This is a preferred, but not critical, design feature of my trolley holder, the primary reason for which is the desire for greater damping capacity with respect to trolley strap 17 than to meat hook ring 53 since forces induced by load swaying transmitted to the strap are a greater derailing threat to the trolley roller than the same forces acting at the ring interlinkage between meat hook 21 and ring 19. Such forces occurring at the ring interlinkage are largely dissipated by the freedom of movement between those members, whereas there is no such safety outlet for forces acting through strap 17 and they are then transmitted, if not damped, to trolley roller 61 with potentially dangerous consequences. Saying perhaps the same thing in another way, it is more logical to concentrate greater damping power against strap 17 than meat hook ring 53 since so much of the load swaying induced force is dissipated at the point of ring interlinkage between the meat hook and ring 19 that to station a heavy concentration of damping power ahead of that point, as it would be if in spring 77, would be a sheer waste of energy. Helical spring 77 is intended primarily as a twist suppressor and as such requires less spring energy than does spring 35, as those skilled in the art will appreciate.

For the above reasons, we prefer to station a larger spring at the position of spring 35 on the drawing than at the spring 77 position. However, as indicated above, this is not a critical limitation and the two springs can be inversely proportioned, or of equal size and power, if desired. Spring 77 does actually damp sway-induced forces to some extent and can, of course, be made large enough to do this much more effectively within the scope of my invention. While the presence of both helical springs 35 and 77 in my trolley holder is highly desirable, one, or even both, could be eliminated, leaving only the trolley roller chock member, described above, with or without springless stabilizing arms corresponding to arms 23, 25, 55 and 57, or some of them, to perform its trolley anchoring function. Such elimination would, of course, result in a loss of a greater or lesser degree of functional effectiveness, depending upon the number and character of the part or parts not omitted.

Returning again to the drawing, no discussion of the spectrum of possible combinations of threaded and nonthreaded relationships between bolts 67 and 69 and the various apertures in stabilizing arms 55 and 57 through which they pass, as well as nuts 75 and 85, is here deemed necessary. Suffice it to say that the scope of coverage with respect to possible combinations of threaded and nonthreaded (including all threaded as well as none threaded) mating relationships set forth above as applicable to bolts 29 and 31, and their cooperating hardware, is equally applicable here.

Figure 4:
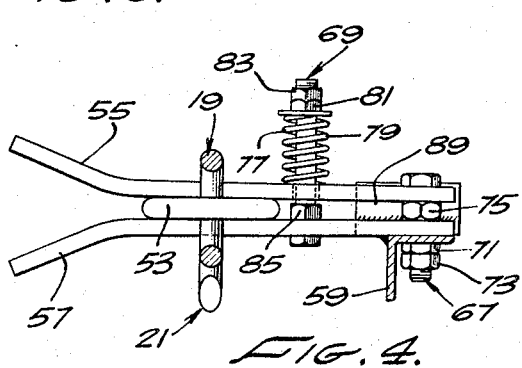
FIGURE 4 is a view, mostly in section, of the device and trolley, taken along line 4—4 of FIGURE 2 and rotated clockwise through an angle of 90 degrees from its FIGURE 2 position.

There are two rectangular plates 87 and 89 welded to angle iron section 59 and projecting outwardly therefrom in close proximity to, and substantially flush with, the upper and lower edges of stabilizing arms 55 and 57. The plates extend from their weld connections to angle iron section 59 past the far edges of stabilizing arm 55, as shown particularly well in FIGURE 4, and by virtue of this serve to prevent up and down swivelling of arms 55 and 57 around bolt 67 under the influence of forces otherwise conducive to such movement. Finally, as the drawing shows, arms 55 and 57 are curved at their forward ends in outwardly diverging directions to form a guideway for easy maneuverability of meat hook ring 53 into its position between the arms.

The manner in which our trolley holder is employed, and its principles of operation, will be clear, it is felt, from the foregoing description of the drawing embodiment of our invention. Briefly, the preferred, but not only, way of using the pictured trolley holder is to first place it in its work site position on the trolley rail and then fasten it in place by turning clamp screw 13 to its limit in the clockwise direction indicated by the directional arrow on FIGURE 1. All that is now necessary to put the trolley holder to work is to roll a meat trolley, loaded or unloaded, into its waiting embrace, being careful to guide the trolley, if necessary, during its first stages of engagement with the holder so that strap 17 and meat hook ring 53 glide into their places of reception between arms 23 and 25 and 55 and 57, respectively.

It is, of course essential that the forwardly extending end of finger 11 be guided into the upper arc of the peripheral groove of trolley roller 61, as the trolley approaches trolley holder 1, but this is ordinarily no problem since the trolley holder is designed to assume proper alignment of the finger with the trolley roller groove when it is in its normal rolling engagement with rail 7. After the trolley has been advanced to incipient engagement of all of its mating parts with their cooperating counterparts on the trolley holder, it is pressed to firm fitting contact between finger 11 on the holder and the inner walls of the peripheral groove in trolley roller 61. This results in a tight fit between the finger and trolley roller groove and assures concurrent downward pressure on the roller and firm friction contact with the walls of said groove, each of which contributes substantially to the overall chocking efficacy of the holder.

The trolley holder can, of course, be employed in a procedurally reverse manner to that just described if desired, that is by first positioning the trolley to be held in its proper place and then fitting the trolley holder thereto and clamping it in place on the rail. After this, the interfit between trolley and trolley holder can be tightened, if necessary, by pressing manipulation of the former.

Our trolley holder can be made in various sizes and with variously sized working parts, depending, for one thing, upon the size of meat trolley with which it is intended to be used. To give an idea of typical size ranges of the involved parts, it can be stated that meat trolley rollers are conventionally either four or five inches in diameter and the rails on which they ride are normally either ⅜ or ½ inch in thickness and 2½ inches wide. We have built and successfully used a trolley holder designed substantially in accordance with the preferred embodiment shown in the drawing. Size dimensions of key parts of this holder are listed below, the parts being designated by the applicable identifying numbers on the drawing.

| Part | Dimensions (inches) |
|---|---|
| Finger 11 | ½ inch square (in cross-section). |
| Stabilizing arm 23 | ⅜ x 1¼ x 8. |
| Stabilizing arm 25 | ⅜ x 1¼ x 8. |
| Each sidewall of slider 5 | ⅜ x 2½ (width). |
| Outside height of each sidewall of slide 5 | 3½. |
| Rod section 9 | ⅜ (diameter) x 5. |
| Vertical distance between arms 23 and 25 and arms 55 and 57 | 6¾ (top edge to top edge). |
| Angle iron section 59 | 1 x 1 x 3/16 x 8. |
| Stabilizing arm 55 | ¼ x 1 x 8. |
| Stabilizing arm 57 | ¼ x 1 x 8. |
| Rectangular plate 87 | 3/16 x 1½ x ⅞. |
| Rectangular plate 89 | 3/16 x 1½ x ⅞. |
| Distance of bend point for spread of tips of forward ends of arms 23 and 25 from end of each arm | 1½. |
| Distance of bend point for spread of tips of forward ends of arms 55 and 57 from end of each arm | 1½. |
| Spread of tips of forward ends of arms 23 and 25 | 1½. |
| Spread of tips of forward ends of arms 55 and 57 | 1½. |

From the foregoing information, and the teachings herein, one skilled in the art would have no difficulty in constructing an operable trolley holder for use with typically-sized trolley systems of suitable type or in improvising a holder for use with a trolley of any size. While the meat trolley utilization aspects of our trolley holder have been emphasized above, the holder is not limited to this particular utilization and it can be functionally incorporated into any trolley system to which its design, in broad concept, suits it. For example, the trolley holder can be used in produce warehouses, or the like, where heavy loads, such as stalks of bananas, are conveyed from place to place by overhead trolleys.

It has previously been made clear that the particular version of our trolley holder illustrated in the accompanying drawing is merely exemplary of a preferred embodiment thereof. From this, it will be appreciated that there are many variants of the pictured embodiment of the trolley holder within the scope of our invention, some of which have already been touched upon and others of which will become apparent to those skilled in the art with a knowledge of the present teachings. An example within the latter categoy would be a modified form of our preferred trolley holder adaptable for use on a trolley with no peripheral groove. There are, or conceivably could be, trolleys with means other than peripheral grooves to help keep them seated on a monorail during rolling movement. The improvisation and substitution of a modified chock member, such as, for example, a member like finger 11 but with down-turned side flange at its point of contact with the upper rim of the roller, for use with a grooveless roller would not unduly tax the ingenuity of one skilled in the art and would, therefore, constitute practice of our invention and yield a product within its scope. It is even conceivable that a trolley holder could be designed to accommodate trolleys with rollers which run on the underside of monorails within the purview of our invention.

In summary, our invention has been described in considerable detail in order to comply with the patent laws by providing a full public disclosure of one of its preferred embodiments. However, such detailed description is not intended in any way to limit the broad features or principles of the invention or the scope of patent monopoly sought except insofar as dictated by the breadth of the following claims.

What is claimed is:

1. The combination with an overhead monorail, and a trolley conveyor embodying a grooved wheel revolubly supported on the monorail, a vertically extending hanger having its upper portion rotatably secured to said wheel, and load engaging means on the lower extremity of said hanger, of a trolley holding station adapted to stop the trolley conveyor at a selected position along the length of the monorail and thereafter secure the trolley conveyor in its stopped position, said holding station comprising, in combination:

a supporting frame adapted to be positioned on said monorail at a selected position along the length thereof;

manually operable means for releasably securing said supporting frame to said monorail;

a finger carried by said supporting frame, disposed directly above the upper surface of said monorail in substantially parallel relationship thereto, said finger being spaced above said monorail by distance approximately equal to the diameter of said grooved wheel as measured between the bottoms of the groove therein, said finger extending away from said supporting frame in the direction from which the trolley conveyor is to be received; and the protruding end of said finger being tapered to a point so as to correctly engage the groove on the top of said wheel in spite of minor variations in the position of the hanger from a precisely vertical alignment as the trolley conveyor approaches the holding station.

2. The apparatus of claim 1 wherein said finger is tapered throughout its length so as to effect a gradually tightening friction contact between said finger and both the bottom and side walls of the groove in the grooved wheel as the trolley conveyor is decelerating upon its arrival at the holding station.

3. The apparatus claimed in claim 1 wherein the hanger is a flat metal strap disposed in a plane that is parallel to the plane of the monorail, and which additionally includes a horizontally separated pair of arms supported from said support frame and disposed beneath the monorail in generally parallel relationship to said finger, said arms being bent outwardly at their forward ends so as to receive the hanger strap therebetween, the inner portion of said arms being normally spaced less than the width of the hanger strap but being resiliently deflectable so as to receive the hanger strap in tight frictional engagement.

4. Apparatus as claimed in claimed 3 which additionally includes a stop disposed between the inner portions of said arms for maintaining a minimum normal distance between said arms, and spring means associated with said arms for urging said arms together.

5. Trolley holding means adapted to substantially prevent movement of a trolley with a peripherally grooved trolley roller on an elevated rail comprising, in combination:

(a) chock means adapted to fit into and bear downwardly and outwardly against the inner surfaces of said peripherally grooved trolley roller with sufficient force to substantially prevent movement of the roller under the influence of forces otherwise conducive to such movement, said chock means comprising a metal finger with its forward end so sized and tapered as to permit its insertion into said peripheral groove with continually increasing tightness therein;

(b) means establishing and maintaining proper spatial orientation of said chock means relative to said trolley roller whereby the roller can be chocked by relative movement between it in rolling position on a rail and the chock means, including a trolley rail embracing slider and means fixedly securing said metal finger to said slider; and (c) means adapted to removably secure said chock means to said rail in functioning position, including clamp means associated with said slider adapted to clamp said slider to said trolley rail, whereby the trolley holding means can be moved to and from, and temporarily installed at, different rail locations.

References Cited

UNITED STATES PATENTS

| | | | |
|---|---|---|---|
| 124,636 | 3/1872 | Snyder | 188—17 |
| 2,786,427 | 3/1957 | Reich | 104—96 |
| 2,818,031 | 12/1957 | Peele et al. | 104—93 |
| 3,138,114 | 6/1964 | Knippel | 104—89 |
| 3,227,097 | 1/1966 | Chaney et al. | 104—89 |

ARTHUR L. LA POINT, *Primary Examiner.*

J. E. BABER, *Assistant Examiner.*